(12) United States Patent
Tan et al.

(10) Patent No.: US 8,217,751 B2
(45) Date of Patent: Jul. 10, 2012

(54) ELECTRONIC DEVICE AND METHOD

(75) Inventors: Daniel Qi Tan, Rexford, NY (US); Patricia Chapman Irwin, Altamont, NY (US); Abdelkrim Younsi, Ballston Lake, NY (US)

(73) Assignee: General Electric Company, Niskayuna, NY (US)

(*) Notice: Subject to any disclaimer, the term of this patent is extended or adjusted under 35 U.S.C. 154(b) by 909 days.

(21) Appl. No.: 12/240,200

(22) Filed: Sep. 29, 2008

(65) Prior Publication Data
US 2009/0140833 A1    Jun. 4, 2009

Related U.S. Application Data

(60) Provisional application No. 60/991,871, filed on Dec. 3, 2007.

(51) Int. Cl.
*H01C 7/10* (2006.01)

(52) U.S. Cl. ......... 338/20; 338/21; 252/519.51; 501/94; 29/610.1

(58) Field of Classification Search .............. 338/20–21; 252/519.51; 501/1, 94, 134; 29/610.1
See application file for complete search history.

(56) References Cited

U.S. PATENT DOCUMENTS

| | | | |
|---|---|---|---|
| 4,681,717 A | 7/1987 | Brooks et al. | |
| 4,992,333 A | 2/1991 | Hyatt | |
| 4,996,510 A | 2/1991 | Becker et al. | |
| 5,039,452 A | 8/1991 | Thompson et al. | |
| 5,153,554 A | 10/1992 | Becker et al. | |
| 5,235,310 A | 8/1993 | Cowman et al. | |
| 5,271,969 A | 12/1993 | Ogura | |
| 5,369,390 A | 11/1994 | Lin et al. | |
| 5,484,766 A | 1/1996 | Shah et al. | |
| 5,594,406 A | 1/1997 | Koyama et al. | |
| 5,811,033 A | 9/1998 | Itoh et al. | |
| 5,952,040 A * | 9/1999 | Yadav et al. | 427/126.3 |
| 5,973,588 A | 10/1999 | Cowman et al. | |
| 5,973,589 A * | 10/1999 | Wu et al. | 338/21 |
| 6,351,011 B1 | 2/2002 | Whitney et al. | |
| 6,366,193 B2 | 4/2002 | Duggal et al. | |
| 6,373,372 B1 | 4/2002 | Duggal et al. | |
| 6,444,504 B1 | 9/2002 | Zivic | |
| 6,542,065 B2 | 4/2003 | Shrier et al. | |
| 6,620,346 B1 | 9/2003 | Schulz et al. | |
| 6,627,100 B2 | 9/2003 | Ando et al. | |
| 6,636,403 B2 | 10/2003 | McLoughlin et al. | |
| 6,913,827 B2 | 7/2005 | George et al. | |
| 7,075,404 B2 * | 7/2006 | Hirose et al. | 338/21 |
| 7,085,118 B2 | 8/2006 | Inoue et al. | |
| 7,132,922 B2 | 11/2006 | Harris | |

(Continued)

OTHER PUBLICATIONS

Levinson, "The Physic of metal oxide varistors". Journal of Applied Physics, vol. 46, No. 3 Mar. 1975, pp. 1332-1341.*

(Continued)

*Primary Examiner* — Kyung Lee
(74) *Attorney, Agent, or Firm* — Joseph J. Christian (57) ABSTRACT

An article is provided that includes a plurality of layers. Each layer includes a sinterable mass having a sinter temperature that is less than about 1000 degrees Celsius, and an inner electrode proximate to the sinterable mass. The inner electrode includes a material having a melting point that is within a determined temperature range of about 10 degrees Celsius to about 200 degrees Celsius relative to the sintering temperature. A method to make the article is also provided.

32 Claims, 6 Drawing Sheets

U.S. PATENT DOCUMENTS

| | | |
|---|---|---|
| 7,167,352 B2 | 1/2007 | Matsuoka et al. |
| 7,258,819 B2 | 8/2007 | Harris |
| 7,277,003 B2 | 10/2007 | Inoue et al. |
| 7,279,724 B2 | 10/2007 | Collins, III et al. |
| 7,372,352 B2 | 5/2008 | Lee et al. |
| 7,372,357 B2 * | 5/2008 | Nakano .......................... 338/21 |
| 7,649,436 B2 * | 1/2010 | Nakano .......................... 338/21 |
| 2004/0015983 A1 | 1/2004 | Lemmons |

OTHER PUBLICATIONS

R.G Dosch et al.; "Chemical preparation and properties of high-field zinc oxide varistors"; J. Mater. Res. vol. 1(1), pp. 90-99, Jan./Feb. 1986.

Yuanhua Lin et al.; "Characterisation of ZnO-based Varistors Prepared from Nanometre Precursor Powders"; Advanced Materials for Optics and Electronics, Advanced Materials.Opt.Electron, vol. 9, pp. 205-209, 1999.

Tohver et al.; "Direct-Write Fabrication of Zinc Oxide Varistors"; J. Am. Ceram. Soc., 85 [1],123-28 (2002).

Pedro Duran et al.; "A Strategic Two-Stage Low-Temperature Thermal Processing Leading to Fully Dense and Fine-Grained Doped-ZnO Varistors"; Advanced Materials, vol. 14(2), pp. 137-141, 2002.

Suresh C. Pillai et al.; "The effect of processing conditions on varistors prepared from nanocrystalline ZnO"; J. Mater.Chem. vol. 13, pp. 2586-2590, 2003.

Nelson S. Bell et al.; "Colloidal processing of chemically prepared zinc oxide varistors. Part II: Near-net-shape forming and fired electrical properties"; J. Mater. Res. vol. 19(5), pp. 1341-1347, 2004.

Suresh C. Pillai et al.; "Self-assembled arrays of ZnO nanoparticles and their application as varistor materials"; J.Mater.Chem. vol. 14, pp. 1572-1578, 2004.

Fangli Yuan et al.; "Microstructure of Varistors Prepared with Zinc Oxide Nanoparticles Coated with Bi2O3"; J. Am. Ceram. Soc., 87 [4] 736-38 (2004).

US 7,336,465, 02/2008, Lee (withdrawn)

* cited by examiner

ELECTRONIC DEVICE AND METHOD

RELATED APPLICATIONS

This application is a non-provisional application that claims priority to provisional U.S. Pat. application Ser. No. 60/991,871, filed Dec. 3, 2007; the disclosure of which is hereby incorporated by reference.

BACKGROUND

1. Technical Field

The invention includes embodiments that relate to an article, for use as a surge protector and/or a varistor. The invention includes embodiments that relate to a method of making and/or using the derived device.

2. Discussion of Art

A varistor is an electronic component with a non-ohmic current-voltage characteristic. Varistors may protect circuits against excessive transient voltages by incorporating them into the circuit in such a way that, when triggered, they will shunt the current created by the high voltage away from the sensitive components. A varistor may be known as Voltage Dependent Resistor or VDR.

A type of varistor is the Metal Oxide Varistor (MOV). This contains a ceramic mass of zinc oxide grains, in a matrix of other metal oxides (such as small amounts of bismuth, cobalt, manganese) sandwiched between two metal plates (the electrodes). The boundary between each grain and its neighbour forms a diode junction, which allows current to flow in only one direction. The mass of randomly oriented grains is electrically equivalent to a network of back-to-back diode pairs, each pair in parallel with many other pairs. When a small or moderate voltage is applied across the electrodes, only a tiny current flows, caused by reverse leakage through the diode junctions. When a large voltage is applied, the diode junctions break down because of the avalanche effect, and a large current flows. The result of this behaviour is a highly nonlinear current-voltage characteristic, in which the MOV has a high resistance at low voltages and a low resistance at high voltages.

A varistor remains non-conductive as a shunt mode device during normal operation when voltage remains well below its "clamping voltage". If a transient pulse (often measured in joules) is too high, the device may melt, burn, vaporize, or otherwise be damaged or destroyed. This unacceptable (catastrophic) failure occurs when "Absolute Maximum Ratings" are exceeded. Varistor degradation is defined using curves that relate current, time, and number of transient pulses. A varistor fully degrades when its "clamping voltage" has changed by 10 percent. A fully degraded varistor may remain functional, having no catastrophic failure, and may not be visually damaged.

It may be desirable to have a method that differs from those methods currently available to provide an article or a composition with properties and characteristics that differ from those properties of currently available articles and compositions.

BRIEF DESCRIPTION

In one embodiment, an article is provided that includes a plurality of layers. Each layer includes a sinterable mass having a sinter temperature that is less than about 1000 degrees Celsius, and an inner electrode proximate to the sinterable mass. The inner electrode includes a material having a melting point that is within a determined temperature range of about 10 degrees Celsius to about 200 degrees Celsius above the sintering temperature.

In one embodiment, an article is provided that includes a plurality of layers. Each layer includes a sinterable mass having a sinter temperature that is less than about 1000 degrees Celsius, and an inner electrode proximate to the sinterable mass. The inner electrode includes a material having a melting point that is within a determined temperature range of about 10 degrees Celsius to about 200 degrees Celsius relative to the sintering temperature.

In one embodiment, a method is provided that includes sintering a sinterable mass at a temperature profile that may be sufficiently high such that a sintered mass may be formed from the sinterable mass. The temperature profile may be less than about 1050 degrees Celsius. The method includes forming one or more inner electrodes coupled to the sintered mass simultaneously with the sintering, and thereby forming an article having plurality of layers. Each layer including at least two inner electrodes coupled to, and in electrical communication through, the sintered mass.

DETAILED DESCRIPTION

The invention includes embodiments that relate to a device for use as a surge protector and/or varistor. The invention includes embodiments that relate to a method of making and/or using the derived device.

As used herein, the term sintering is a method for making objects from particles or powder by heating the material (below its melting point) until its particles adhere to each other. Sintered refers to particles or powder that has undergone a sintering process. A sintered mass refers to the formed shape that is the result of the sintering of powders or particulate. In the sintered mass, formerly discrete particles or powder grains retain a core, and the interstitial area from one core to another core is at least partially filled with a grain boundary layer that separates the cores.

In one embodiment, an article is provided that includes a plurality of layers. In another embodiment, each layer includes a sinterable mass having a sinter temperature that is less than about 1000 degrees Celsius, and an inner electrode proximate to the sinterable mass.

In one embodiment, the inner electrode comprises a material having a melting point that is within a determined temperature range of about 10 degrees Celsius to about 200 degrees Celsius above a sintering temperature of the sinterable mass. In one embodiment, the inner electrode includes a material that has a melting point that may be within a determined temperature relative to a sintering temperature of the sinterable mass. In another embodiment, the inner electrode may include a metal having a melting point of less than about 1000 degrees Celsius. In another embodiment, the inner electrode may include a metal having a melting point in a range from about 1000 degrees Celsius to about 950 degrees Celsius, from about 950 degrees Celsius to about 900 degrees Celsius, from about 900 degrees Celsius to about 875 degrees Celsius, or from about 875 degrees Celsius to about 850 degrees Celsius, or from about 850 degrees Celsius to about 750 degrees Celsius.

In one embodiment, the inner electrode may include silver. In one embodiment, the inner electrode is an alloy that includes one or more of aluminum alloy, silver-palladium alloy, copper, silver, tin, aluminum, iron, carbon, nickel, chromium, or gold, and which is present in an amount or a ratio such that the melting temperature of the inner electrode may be controlled relative to the sintering temperature of the sinterable mass. Control of the melting temperature allows for co-firing of the inner electrode and the sinterable mass at about the sintering temperature to produce an article. Alloys of the foregoing may be selected based on application specific parameters (such as brass or Ni—Sn). In one embodiment, the inner electrode includes carbon, and the carbon may be amorphous or structured (such as in a nanotube or nanowire). In yet another embodiment, the inner electrode may be free of platinum, palladium, or both platinum and palladium. In another embodiment, the amount of platinum, palladium, or both platinum and palladium may be less than about 0.05 weight percent.

In one embodiment, the article may include an outer electrode. In one embodiment, the outer electrode may include one or more of lead, tin, aluminum, copper, gold, silver, lead-tin alloy, tin-copper alloy, palladium, or alloys of the forgoing. Alloys of the foregoing are also suitable based on application specific parameters (such as brass or Ni—Sn, lead-tin alloy, tin-copper alloy, aluminum alloy). In one embodiment, the outer electrode includes carbon, and the carbon may be amorphous or structured (such as in a nanotube or nanowire). In one embodiment, the outer electrode may not be co-fired along with the inner electrode and the sinterable mass.

In one embodiment, the sinterable mass includes a transition metal. In one embodiment, the transition metal may be a transition metal oxide. Examples of transition metal oxides include but are not limited to zinc oxide, tin oxide, and titanium oxide. In one embodiment, the transition metal oxide includes a zinc oxide. The amount of the transition metal oxide, by weight, may be greater than about 80 percent based on the total weight of the sinterable mass. In one embodiment, the amount may be in a range of from about 80 weight percent to about 85 weight percent, from about 85 weight percent to about 90 weight percent, or from about 90 weight percent to about 95 weight percent, or from about 95 weight percent to about 98 weight percent based on the total weight of the sinterable mass.

In one embodiment, the sinterable mass may include a sintering additive and a grain growth inhibitor additive. In one embodiment, the sintering additive may include one or more of aluminum, lithium, antimony, bismuth, cobalt, chromium, manganese, nickel, magnesium, or silicon. The sintering additive may include a combination of two or more of the foregoing. In one embodiment, the sintering additive includes one or more of $SiO_2$, $Mn_2O_3$, NiO, $MnO_2$, or $MnCO_3$. In one embodiment, the sintering additive may include one or more of $Li_2CO_3$, and $LiBiO_3$. In one embodiment, the sintering additive may include only one of the foregoing. The selection of the sintering additive may be based on one or more factors as the sintering additives differ in efficacy and effect. Such factors may include the desired sintering temperature, the sintering pressure, the material performance, and the desired grain characteristics.

In one embodiment, the sinterable mass includes a grain growth inhibitor additive. In one embodiment, the grain growth inhibitor additive may include one or more of $Sb_2O_3$, CaO, $Al_2O_3$, MgO, or $Fe_2O_3$. In one embodiment, the grain growth inhibitor may consist essentially of only one of the foregoing. The selection of the grain growth inhibitor additive may be based on one or more factors as the grain growth inhibitor additive differ in efficacy and effect. Such factors may include the desired sintering temperature, the sintering pressure, the material performance, and the desired grain characteristics. In one embodiment, the grain growth inhibitor additive may inhibit grain growth to maintain relatively smaller grains. In one embodiment, the grain growth inhibitor additive may include a combination of two or more of the foregoing. In another embodiment, the grain growth inhibitor additive may control the grain size distribution, as well.

In one embodiment, the sinterable mass may further include a grain boundary additive. In one embodiment, the grain boundary additive includes a breakdown voltage additive. In one embodiment, the grain boundary additive may enhance the grain boundary barrier. In one embodiment, the grain boundary additive may include one or more of $Co_3O_4$, $Co_2O_3$, $Cr_2O_3$, $Bi_2O_3$, $Pr_2O_3$, NiO, or $SnO_2$. In one embodiment, the grain boundary additive consists essentially of only one of the foregoing. The selection of the grain boundary additive may be based on one or more factors as the grain boundary additive differ in efficacy and effect. Such factors may include the desired sintering temperature, the sintering pressure, the material performance, and the desired grain characteristics. The grain boundary additive may be present in an amount less than about 1 weight percent. In one embodiment, the grain boundary additive may be present in an amount in a range of from about 0.01 weight percent to about 0.5 weight percent, from about 0.5 weight percent to about 0.75 weight percent, or from about 0.75 weight percent to about 1 weight percent. In one embodiment, the composition may be free of $Co_2O_3$. In another embodiment, the amount of $Co_2O_3$ may be less than about 0.05 weight percent. In one embodiment, the additive may include a combination of two or more of the foregoing.

In one embodiment the article may be sintered to form a nano-structured varistor. The nano-structured varistor may include a sintered mass and an inner electrode. The sintered mass includes a plurality of nano-sized cores and a grain boundary layer disposed between each of the plurality of cores. Each of the cores may include the transition metal oxide. The grain boundary layer may include the sintering additive, the grain boundary additive, and/or a breakdown voltage additive. In one embodiment, the grain boundary layer may be disposed between each of the plurality of the cores.

Figure 1:
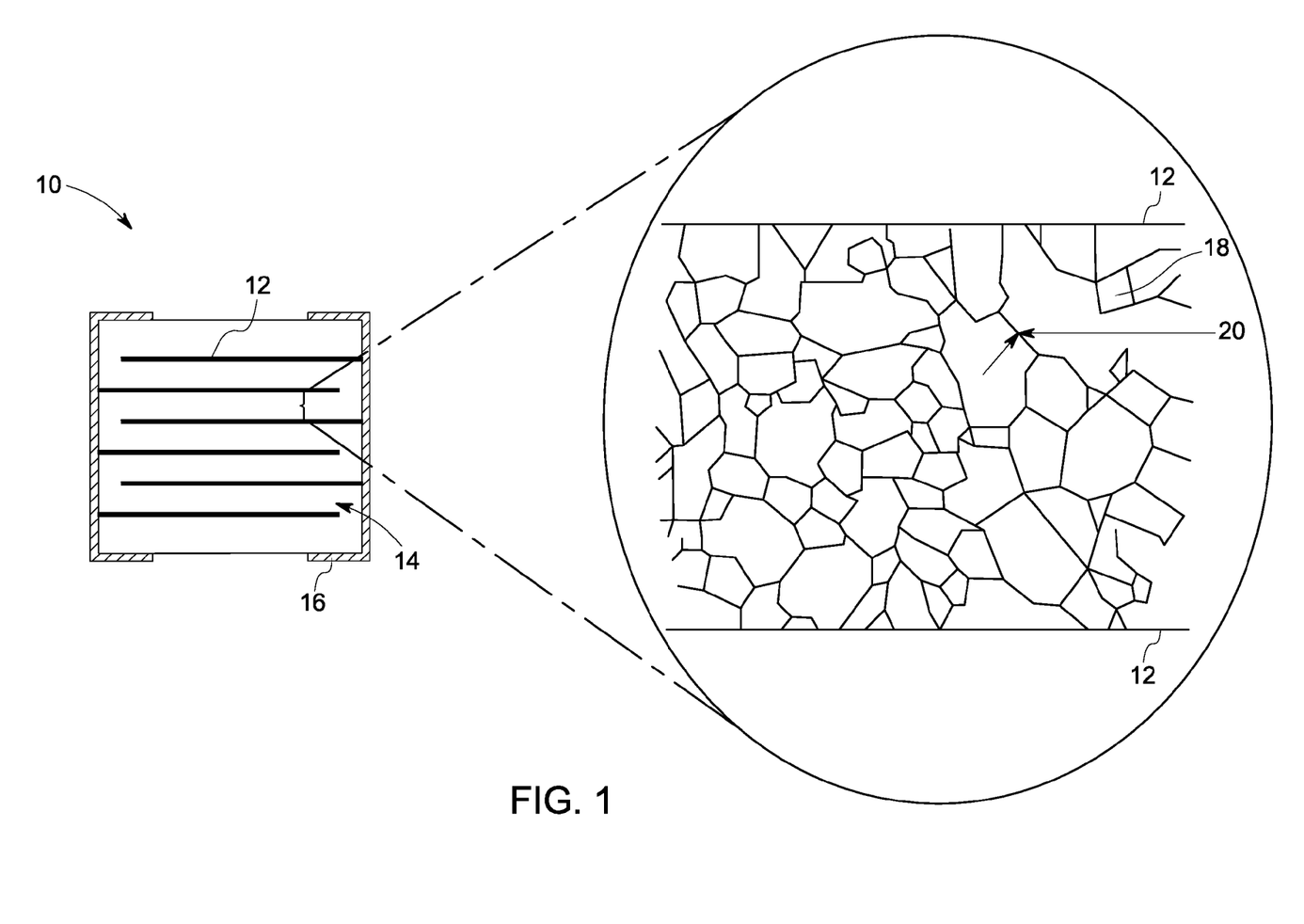
FIG. 1 shows a schematic drawing of an article in accordance with one embodiment of the invention.

In one embodiment, the article includes a varistor having a structure as shown in FIG. 1. A varistor 10 is provided which includes a plurality of inner electrodes 12 consisting of silver and a sintered mass 14. The inner electrodes and the sintered mass are encapsulated by termination and the terminal 16 may be connected to an outer electrode. The sintered mass includes a plurality of nano-sized cores 18 and a grain boundary layer 20 disposed between each of the plurality of cores.

In one embodiment, the sintering additive may be present in an amount that may be less than about 20 percent by weight, based on the total weight of the sintered mass. In one embodiment, the sintering additive amount may be in a range of from about 20 percent to about 15 percent, from about 15 percent to about 10 percent, from about 10 percent to about 8 percent, from about 8 percent to about 4 percent, from about 4 percent to about 2 percent, from about 2 percent to about 0.5 percent, from about 0.5 percent to about 0.3 percent, or from about 0.3 percent to about 0.1 percent, or from about 0.1 percent to about 0.03 percent.

In one embodiment, the grain growth inhibitor additive may be present in the sintered mass in an amount, by weight, that is less than about 10 percent based on the total weight of the sintered mass. In one embodiment, the grain growth inhibitor additive amount may be in a range of from about 10 weight percent to about 8 weight percent, from about 8 weight percent to about 6 weight percent, 6 weight percent to about 4 weight percent, from about 4 weight percent to about 2 weight percent, from about 2 weight percent to about 1 weight percent, from about 1 weight percent to about 0.5 weight percent, from about 0.5 weight percent to about 0.1 weight percent, or less than about 0.1 weight percent.

In one embodiment, the grain boundary additive may be present in the sintered mass in an amount, by weight, that may be less than about 10 percent based on the total weight of the sinterable mass. In one embodiment, the grain boundary additive may be present in an amount in a range of from about 10 weight percent to about 8 weight percent, from about 8 weight percent to about 6 weight percent, from about 6 weight percent to about 4 weight percent, from about 4 weight percent to about 2 weight percent, from about 2 weight percent to about 1 weight percent, from about 1 weight percent to about 0.5 weight percent, from about 0.5 weight percent to about 0.1 weight percent, or less than about 0.1 weight percent.

The nanostructured varistor may include a sintered mass having a plurality of nano-sized cores. In one embodiment, the average distance from one core to an adjacent core in the plurality of cores may be less than about 1 micrometer. In one embodiment, the average distance may be in a range of from about 1 micrometer to about 0.8 micrometers, or from about 0.8 micrometers to about 0.5 micrometers. In another embodiment, the average distance may be in a range of from about 500 nanometers to about 400 nanometers, from about 400 nanometers to about 300 nanometers, from about 300 nanometers to about 250 nanometers, from about 250 nanometers to about 200 nanometers, from about 200 nanometers to about 150 nanometers, from about 150 nanometers to about 100 nanometers, from about 100 nanometers to about 50 nanometers, or less than about 50 nanometers.

In one embodiment, the average diameter of the core in the plurality of cores may be less than about 1 micrometer. In one embodiment, the average diameter may be in a range of from about 1 micrometer to about 0.8 micrometers, or from about 0.8 micrometers to about 0.5 micrometers. In another embodiment, the average diameter may be in a range of from about 500 nanometers to about 400 nanometers, from about 400 nanometers to about 300 nanometers, from about 300 nanometers to about 250 nanometers, from about 250 nanometers to about 200 nanometers, from about 200 nanometers to about 150 nanometers, from about 150 nanometers to about 100 nanometers, from about 100 nanometers to about 50 nanometers, or less than about 50 nanometers.

The microstructure or nanostructure of the sintered mass may be expressed in terms of an average distance from one core to an adjacent core in the sintered mass. The average distance from one core to an adjacent core in the sintered mass may be less than 5 micrometers. In one embodiment, the average distance may be in a range of from about 1 micrometer to about 0.8 micrometers, or from about 0.8 micrometers to about 0.5 micrometers. In another embodiment, the average distance may be in a range of from about 500 nanometers to about 400 nanometers, from about 400 nanometers to about 300 nanometers, from about 300 nanometers to about 250 nanometers, from about 250 nanometers to about 200 nanometers, from about 200 nanometers to about 150 nanometers, from about 150 nanometers to about 100 nanometers, from about 100 nanometers to about 50 nanometers, or less than about 50 nanometers. An exemplary core-to-core average distance may be in a range of from about 35 nanometers to about 75 nanometers.

The distance of one core to another core, coupled with the core size, may affect the average thickness of the grain boundary layer. In one embodiment, the average thickness of the grain boundary layer may be less than about 1 micrometer. In another embodiment, the average thickness may be in a range of from about 1 micrometer to about 0.8 micrometers, or from about 0.8 micrometers to about 0.5 micrometers. In yet another embodiment, the average thickness may be in a range of from about 500 nanometers to about 400 nanometers, from about 400 nanometers to about 300 nanometers, from about 300 nanometers to about 250 nanometers, from about 250 nanometers to about 100 nanometers, from about 100 nanometers to about 50 nanometers, from about 50 nanometers to about 35 nanometers, from about 35 nanometers to about 20 nanometers, or less than about 20 nanometers.

The grain boundary layer thickness, may be expressed as a mean value in nanometers. The mean value for the grain boundary layer may be less than about 50 nanometers. In one embodiment, the mean value may be in a range of from about 50 nanometers to about 10 nanometers, from about 10 nanometers to about 1 nanometer, or from about 1 nanometer to about 0.1 nanometers.

In one embodiment, the average thickness of the nano-structured sintered mass may be less than 3000 micrometers. In another embodiment, the average thickness of the nano-structured sintered mass may be in a range of from about 3000 micrometer to about 2500 micrometers, or from about 2500 micrometer to about 2000 micrometers, or from about 2000 micrometer to about 1550 micrometers, or from about 1550 micrometer to about 1000 micrometers, or from about 1000 micrometer to about 700 micrometers, or from about 700 micrometers to about 500 micrometers. In yet another embodiment, the average thickness of the nano-structured sintered mass may be in a range of from about 500 micrometers to about 100 micrometers, from about 100 micrometers to about 50 micrometers. In another embodiment, average thickness of the nano-structured sintered mass may be less than 50 micrometers.

In addition to such factors as the uniformity of core diameters, the uniformity of distribution of materials, and the uniformity of the grain boundary layer, the average distance of the cores from one to another may affect the performance, properties and characteristics of the varistor device made therefrom. Particularly, the diode junction performance, and the number of diode junctions per unit volume, may flow directly from the core spacing parameter.

The thermal profile may play a role in the melt temperature of the inner electrode of the MOV device. If the thermal profile is higher than the inner electrode melt temperature, then the inner electrode may be melted, damaged or destroyed. A higher thermal excursion during manufacture or sinter may then require an inner electrode with a corresponding melt temperature suitable for use after exposure to that temperature. In addition, if the thermal profile shows a temperature excursion too high, the microstructure or nanostructure may change and the sintered particles may melt and flow together rather than remain as a sintered mass. This may need to be balanced, as at least some heat is needed to get the particles to sinter in the first instance. Lower temperature capable inner electrode materials may be employed to avoid a high thermal profile in addition to being economically desirable. In one embodiment, the inner electrode may include a metal having a melting point of less than the temperature profile.

In one embodiment, the article may be produced by sintering a sinterable mass at a temperature profile that may be sufficiently high such that a sintered mass may be formed from the sinterable mass. In one embodiment, the temperature profile includes exposure to a sinter temperature of less than about 1050 degrees Celsius. The sintered may have a thermal profile also known as thermal history that may include exposure to a sintering temperature of not greater than about 1050 degrees Celsius. In one embodiment, the thermal profile includes exposure to a sinter temperature in a range of from about 1050 degrees Celsius to about 1000 degrees Celsius, from about 1000 degrees Celsius to about 950 degrees Celsius, from about 950 degrees Celsius to about 900 degrees Celsius, from about 900 degrees Celsius to about 875 degrees Celsius, or from about 875 degrees Celsius to about 850 degrees Celsius or from about 850 degrees Celsius to about 800 degrees Celsius.

In one embodiment, the method may include calcining the transition metal oxide and the sintering additive together before forming the mixture. Calcining of the transition metal oxide and the sintering additive may include heating to a temperature that may be greater than about 400 degrees Celsius. In one embodiment, calcining may include exposure of the mixture to a temperature in a range of from about room temperature to about 400 degrees, from about 400 degrees Celsius to about 450 degrees Celsius, from about 450 degrees Celsius to about 550 degrees Celsius, from about 550 degrees Celsius to about 600 degrees Celsius, from about 600 degrees Celsius to about 650 degrees Celsius, or from about 650 degrees Celsius to about 800 degrees Celsius.

In one embodiment, a method may include contacting a transition metal oxide with a sintering additive to form a premix, wherein the transition metal oxide comprises particles that have an average diameter less than about 1 micrometer. The premix may be calcined. The calcining may include heating to a temperature of about 400 degrees Celsius to provide a calcined mass. The calcined mass may be contacted with a grain growth inhibitor additive to form a mixture. The mixture may be sintered at a temperature profile that may be sufficiently high that a sintered mass may be formed from the mixture, and the thermal profile may be less than about 1000 degrees Celsius.

In one embodiment, the method may include forming one or more inner electrodes coupled to the sintered mass simultaneously with the sintering, thereby to form a varistor having one or more inner electrodes coupled to, and in electrical communication through, the sintered mass. In one embodiment, the inner electrode and the sinterable mass may be subjected simultaneously to the sinter temperature to form a metal oxide varistor. The sintered mass and the inner electrode may be co-fired simultaneously to form the article having plurality of layers each layer comprising at least two inner electrodes coupled to, and in electrical communication through, the sintered mass. In one embodiment, the sintering may include directing microwave radiation at the sinterable mass.

In one embodiment, the inner electrode may be formed by pressing, heating, melt flowing, casting, printing, metallizing/etching, and the like. Mechanical methods of attachment may be available in some embodiments. Alternatively, a precursor material may be disposed on the sintered mass and converted into an electrically conductive material.

Figure 2:
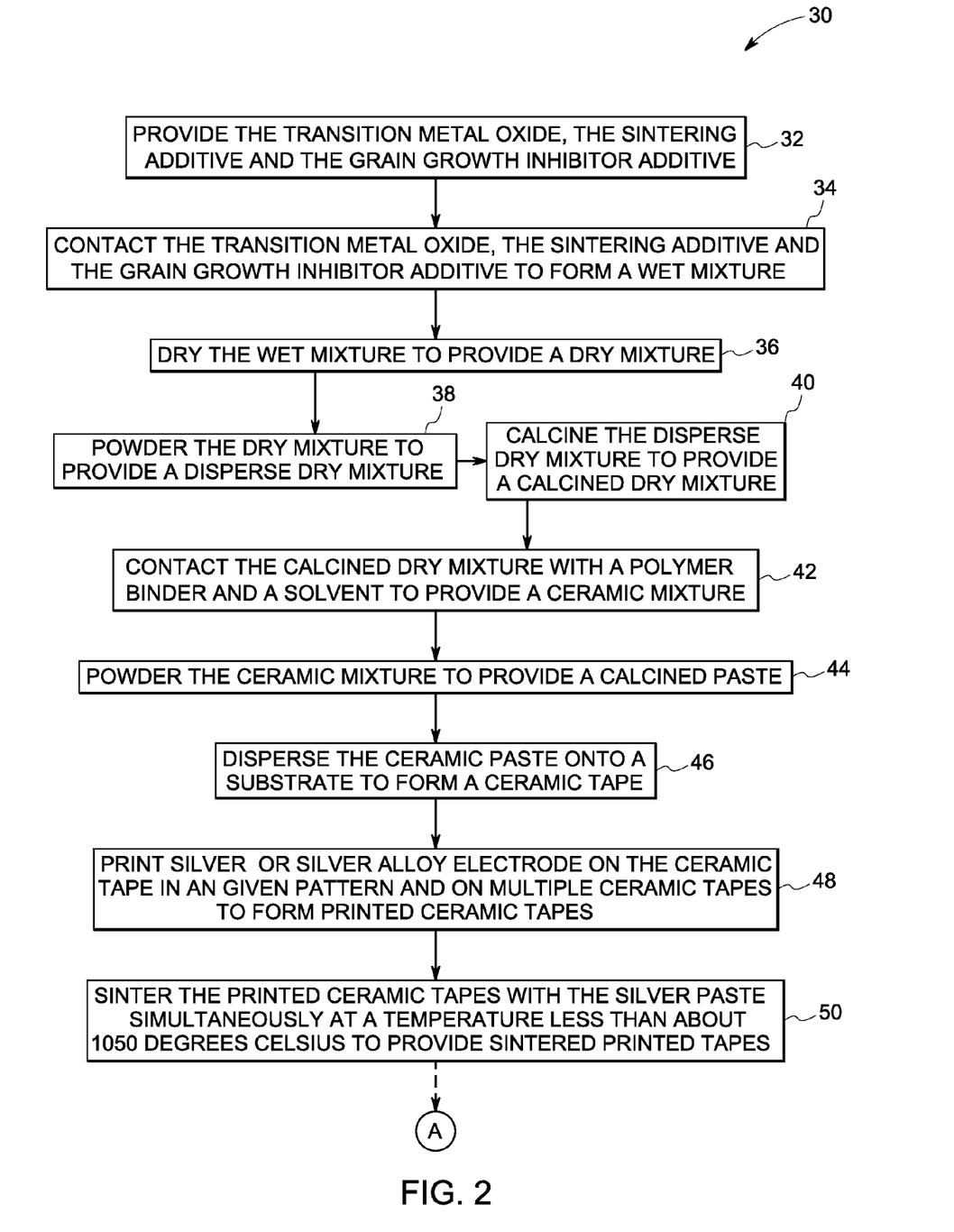
FIG. 2 shows a block diagram of a method to make an article in accordance with one embodiment of the invention.
Figure 3:
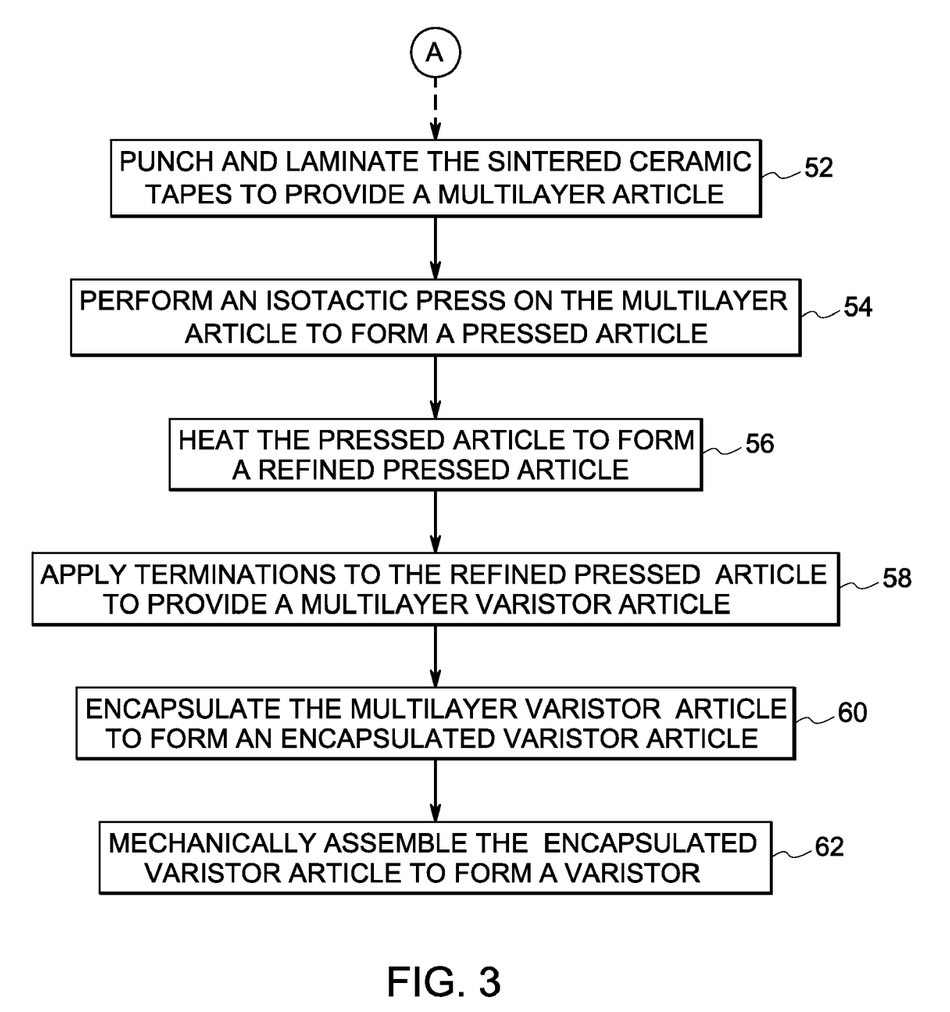
FIG. 3 shows a continuation of the block diagram of FIG. 2 of the method to make an article in accordance with one embodiment of the invention.

A block diagram 30 of one embodiment of a method is provided in FIGS. 2 and 3. The transition metal oxide and the sintering additive and the grain growth inhibitor additive and dispersant are provided or obtained 32. A solvent wets the transition metal oxide to form a wet slurry 34. The wet slurry is dried to provide a dry mixture 36. The dry mixture is powdered to provide a disperse dry mixture 38. The disperse dry mixture is calcined to provide a calcined dry mixture 40. The calcined dry mixture is contacted with a polymer binder and a solvent to provide a ceramic mixture 42. The ceramic mixture is powdered for example in a ball mill to provide a calcined paste 44. In one embodiment, the ceramic mixture is powdered and is pressed into a green body. The calcined paste is dispersed or tape cast onto a substrate to form a ceramic tape 46. The green body or the ceramic tape is printed with silver or silver alloy electrode on the ceramic tape in a given pattern and on multiple ceramic tapes to form printed ceramic tapes 48. The printed ceramic tapes with silver or silver alloy paste are sintered simultaneously at a temperature that is less than 1050 degrees Celsius to provide sintered printed tapes 50. The sintered printed tapes are punched together and laminated to provide a multilayer article 52. An isotatic press is performed on the multilayer article to provide a pressed article 54. The pressed article is heated to form a refined pressed article 56. The terminations are applied to the refined pressed article to provide a multilayer varistor article 58. Encapsulate the multilayer varistor article to form an encapsulated varistor article 60. Add lead electrode onto the encapsulated varistor article and assemble to form a varistor 62.

In one embodiment, the sinterable mass may be sandwiched between two inner electrodes. In one embodiment, the thickness of the sinterable mass is less than about 100 micron. In another embodiment, the thickness of the sinterable mass is in a range from about 100 micron to about 75 micron, from about 75 micron to about 50 micron, from about 50 micron to about 35 micron, from about 30 micron to about 15 micron, from about 15 micron to about 10 micron, from about 10 micron to about 1 micron, from about 1 micron to about 0.5 micron.

In one embodiment, the thickness of the inner electrodes is less than about 100 micron. In another embodiment, the thickness of the inner electrodes is in a range from about 100 micron to about 75 micron, from about 75 micron to about 50 micron, from about 50 micron to about 35 micron, from about 30 micron to about 15 micron, from about 15 micron to about 10 micron, from about 10 micron to about 1 micron, from about 1 micron to about 0.5 micron.

In one embodiment, the thickness of the article is less than about 5 millimeters. In another embodiment, the thickness of the article is in a range from about 5 millimeters to about 2 millimeters, from about 2 millimeters to about 1 millimeters, from about 1 millimeters to about 0.7 millimeters, from about 0.7 millimeters to about 0.5 millimeters, from about 0.5 millimeters to about 0.01 millimeters, In one embodiment, the article may include a sintered reaction product of transition metal oxide particles that have an average diameter that may be less than about 1 micrometer; and sintering additive particles having an average diameter that may be less than about 1 micrometer. The grain growth inhibitor additive particles may have an average diameter that may be less than about 1 micrometer. Due to the change in available surface area, and packing tendencies, particles of different sizes may form sintered masses having differing properties and characteristics.

In one embodiment, the article may include a sintered mass of particles that may include a transition metal oxide, a sintering additive, and a grain growth inhibitor additive. The sintered mass may have a density that may be greater than 98 percent of theoretical density for a composition comprising the transition metal oxide.

In one embodiment, the article may include sintered particles that include a transition metal oxide, a sintering additive, and a grain growth inhibitor additive and defining grains. The grains may have grain boundaries that define the grains to have an average grain size of less than about 0.8 micrometers. In one embodiment, the method includes contacting a transition metal oxide, a sintering additive, and a grain growth inhibitor additive to form a mixture. The mixture may be treated to a temperature profile. In one embodiment, the temperature profile includes exposure to a sinter temperature of less than about 1050 degrees Celsius.

In one embodiment, the article may respond to electrical voltage overstress of about 1 kilo Volts amount by shunting an electrical current to a ground. In another embodiment, the article may respond to electrical voltage overstress in a range from about 0.1 kilo Volts to about 0.5 kilo Volts, from about 0.5 kilo Volts to about 1 kilo Volts, from about 1 kilo Volts to about 5 kilo Volts, from about 5 kilo Volts to about 50 Volts, or from about 50 Volts to about 100 Volts by shunting an electrical current to a ground. In one embodiment, the article may protect against an overstress above a threshold voltage of about 10 volts for a 1 millimeter thick varistor.

In one embodiment, the article may have a dielectric strength or breakdown field of greater than about 0.5 kilo Volt per millimeter. In one embodiment, the dielectric strength or breakdown field may be in a range of from about 0.5 kilo Volt per millimeter to about 1 kilo Volt per millimeter, from about 1 kilo Volt per millimeter to about 1.5 kilo Volt per millimeter, from about 1.5 kilo Volt per millimeter to about 2 kilo Volt per millimeter, from about 2 kilo Volt per millimeter to about 2.5 kilo Volt per millimeter, from about 2.5 kilo Volt per millimeter to about 3 kilo Volt per millimeter, or greater than about 3 kilo Volt per millimeter. In one embodiment, the sintered mass may have a non-linearity coefficient ($\alpha$) of greater than 25. In one embodiment, the non-linearity coefficient ($\alpha$) may be in a range of from about 25 to about 50, from about 50 to about 75, from about 75 to about 100, from about 100 to about 125, from about 125 to about 140, or greater than about 140.

In one embodiment, the article may have a dielectric constant of less than about 1000. In another embodiment, the article may have a dielectric constant in a range from about 1000 to about 800 from about 800 to about 750, or from about 750 to about 500. In one embodiment, the article may have a leakage current of less than about $10^{-5}$ Ampere per square centimeter. In another embodiment, the article may have a leakage current in a range of about $10^{-6}$ Ampere per square centimeter to about $10^{-5}$ Ampere per square centimeter. In one embodiment, the varistor may have a sintered density of more than about 95%.

In one embodiment, the article may be included in an electronic device such as for example a varistor. In another embodiment, a method of protecting an electric circuit is provided wherein the electric circuit includes the electronic device including the article from a transient electrical voltage surge or spike is provided. The method includes electrically connecting the article to a power source for the electrical circuit, and the at least two electrodes to ground.

EXAMPLES

The following examples illustrate methods and embodiments in accordance with the invention, and as such do not limit the claims. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Samples 1 through 3 are prepared by mixing, calcining, ball milling, and sintering. The sintering is performed in a Uniaxial Press to make a puck for each sample that is about 1 inch in diameter. The various components and the weight percent for each of the components for samples 1 to 3 are given in Table 1.

TABLE 1

| Composition (Weight percent) | Sample 1 | Sample 2 | Sample 3 | Comparative Sample 1 | Comparative Sample 2 |
|---|---|---|---|---|---|
| ZnO | 94 | 85.5 | 94.69 | 83.39 | 92.21 |
| $Bi_2O_3$ | 0.5 | 2 | 3 | 2.12 | 1.40 |
| $Sb_2O_3$ | 1 | 3 | 1.5 | 6.34 | 3.75 |
| $Al_2O_3$ | — | 2 | 0.01 | 0.04 | — |
| $SiO_2$ | 2 | 3 | — | 0.43 | 0.07 |
| $Cr_2O_3$ | 0.5 | — | — | — | 1.02 |
| MnO | — | — | — | 0.9 | 0.4 |
| $Mn_2O_3$ | 0.5 | — | 0.1 | — | — |
| MgO | — | 2 | — | — | — |
| $Fe_2O_3$ | — | — | — | 0.01 | 0.04 |
| $Co_2O_3$ | — | — | — | 1.13 | 1.17 |
| $Co_3O_4$ | 0.5 | 2.5 | 0.5 | — | — |
| NiO | 1 | — | 0.2 | 1.27 | — |
| $SnO_2$ | — | — | — | — | 0.93 |

Sample 1

A mixture is formed from zinc oxide, and additives selected from cobalt, antimony, nickel, and chromium oxide nanopowders with bismuth, silicon, manganese oxide nanopowders in a ratio given in Table 1. The zinc oxide is commercially obtainable from Horsehead Coporation, (Monaca, Pa.). The additives are commercially obtainable from Nanostructured and Amorphous Materials Inc. (Houston, Tex.).

The materials form a mixture in a mixed oxide wet process. The mixture is milled in a ball mill for about 6 hours in a ratio materials:ball:isopropyl alcohol=1:5:2 to form a slurry. The slurry is dried at 100 degrees Celsius. The dried powder is sieved and calcined at 550 degrees Celsius for about 2 hours in a Thermolyne 1400 furnace. The calcined powder is then ball milled for about 4 hours. The slurry formed is dried at 100 degrees Celsius and the dried powder is sieved. The powder is then pressed into pellets (thickness of about 1.5 millimeters) with a force of about 10000 pounds for about 1 minute. The pellet is sintered at temperatures from about 1000 degrees Celsius and 1050 degrees Celsius. The sintering is done in two different profiles including one and two steps in a Uniaxial Press for about 2 hours. The first profile is carried out at about at 1050 degrees Celsius at a heating rate of about 5 degrees Celsius per minute for about 2 hours and is allowed to cool. The second profile is carried out at about at 1000 degrees Celsius at a rate of about 10 degrees Celsius per minute for about 0.1 hours. Following this a second step sintering at a temperature of about 925 degrees Celsius to 975 degrees Celsius at a heating rate of about 10 degrees Celsius per minute is carried out for about 2 hours. The resultant product is Sample 1, which has the compositional distribution as indicated in Table 1.

Sample 2

A mixture is formed from zinc oxide, and additives selected from oxide nanopowders cobalt, and antimony, with nanopowder oxides of bismuth, silicon, aluminum and magnesium in a ratio given in Table 1.

The materials are mixed using a mixed Oxide Wet Process. The mixture is milled in a ball mill for about 6 hours in a ratio materials:ball:isopropyl alcohol=1:5:2 to form a slurry. The slurry is dried at 100 degrees Celsius. The dried powder is sieved and calcined at 550 degrees Celsius for about 2 hours in a Thermolyne 1400 furnace. The calcined powder is then ball milled for about 4 hours. The slurry formed is dried at 100 degrees Celsius and the dried powder is sieved. The powder is then pressed into pellets (thickness of about 1.5 millimeters) with a force of about 10000 pounds for about 1 minute. The pellet is sintered in a Uniaxial Press at different temperatures for about 2 hours at about 950 degrees Celsius, about 1050 degrees Celsius at a rate of about 5 degrees Celsius per minute. The resultant product is Sample 2, which has the compositional distribution indicated in Table 1.

Sample 3

A mixture is formed from zinc oxide (from Horsehead Coporation, Monaca, Pa.), and additives selected from powders of cobalt, nickel, and antimony-based materials (from Nanostructured and Amorphous Materials Inc, Houston, Tex.), and with powders of bismuth, aluminum and manganese-based materials in amounts as given in Table 1. The procedure similar to that employed to prepare sample 2 was employed for the preparation of sample 3. The resultant product is Sample 3, which has the compositional distribution indicated in Table 1.

Sample 4

A mixture is formed from zinc oxide, and additives selected from oxide powders cobalt, and antimony, with powder oxides of bismuth, silicon, aluminum and chromium in amounts as given in Table 3. Unless otherwise indicated, the powders are nanoscale and have a narrow size distribution. The general procedure employed for the synthesis of sample 2 is used to prepare sample 4. The resultant product is Sample 4, which has the compositional distribution indicated in Table 3.

Sample 5

A plurality of mixtures are formed from zinc oxide, and additives selected from cobalt, antimony, nickel, and chromium-based powders with bismuth, silicon, manganese-based powders, each in an amount as given in Table 3. The powders, unless context or language indicates otherwise, are nano-scale and have an average diameter that is less than 100 nanometers, and a relatively narrow and mono-modal size distribution. The general procedure employed for the synthesis of sample 1 is used to prepare sample 5. The resultant product is Sample 5, which has the compositional distribution as indicated in Table 3.

Sample 6-12

A mixture is formed from zinc oxide, and additives selected from powders of cobalt, lithium, nickel, and antimony-based materials, with powders of bismuth, and aluminum-based materials in amounts as given in Table 3.

The materials are mixed using a mixed oxide wet process. The mixture is milled in a ball mill for about 6 hours in a ratio of powder ingredients:ball:isopropyl alcohol of 1:5:2 to form a slurry. The slurry is dried at 100 degrees Celsius. The dried powder is sieved and calcined at 550 degrees Celsius for about 2 hours in a THERMOLYNE 1400 furnace. The calcined powder is then ball milled for about 4 hours. The slurry formed is dried at 100 degrees Celsius and the dried powder is sieved. The powder is then pressed into a plurality of pellets (thickness of about 1.5 millimeters) with a force of about 10000 pounds for about 1 minute.

The pellets are sintered in a pressureless mode at different temperatures for about 2 hours. The temperatures are: about 800 degrees Celsius (sample 6), about 850 degrees Celsius (sample 7), about 900 degrees Celsius (sample 8), about 950 degrees Celsius (sample 9), about 1000 degrees Celsius (sample 10), and about 1050 degrees Celsius (sample 11), each at a rate of about 5 degrees Celsius per minute. Sample 6 is subsequently subjected to each of the other temperature profiles. The resultant product pellets are represented in Samples 6-11, which have the compositional distribution indicated in Table 3. Additional samples 12 et seq. have the compositional makeup as indicated in Table 3, and are subject to the temperature profile of Sample 7 (850 degrees Celsius) and are prepared in the same manner as the rest of the samples in the this example.

Example 1

The transition metal oxide and the additives are weighed to provide a powder mixture as in sample 1. The powder mixture of sample 1 is mixed using a ball mill along with a volatile film-forming polymer binder (polyvinyl alcohol and polyethylene glycol) and solvent (deionized water) to form a ceramic mixture paste. The ceramic mixture is pressed into a green body and the ceramic paste is dispersed onto a smooth surface of a rigid substrate (polyethylene terephthalate) with a release agent. The dispersion is heated to a temperature in a range from about 60 degrees Celsius to about 80 degrees Celsius in order to remove the solvent to form ceramic tapes. Silver paste is screen printed on to the green body and the semi-dry ceramic tapes in a given pattern. The printing is repeated on seven semi-dry ceramic tapes as mentioned above. The tapes are then punched, via filled and stacked together. The printed tapes are laminated with interleaved silver electrodes. The silver printed interleaved tapes are heated to a temperature in a range from about 450 degrees Celsius to about 600 degrees Celsius to remove the binder and other organics. The heated silver printed tapes are then sintered simultaneously at a temperature in range from about 800 degrees Celsius to about 950 degrees Celsius to form a varistor. Terminating packages are applied on the varistor. The varistor is connected to other circuit elements to form an electrical communication 60 as shown in FIG. 3. Encapsulation of the varistor and the attachment of the leads are made.

Example 2

The transition metal oxide and the additives are weighed to provide a powder mixture as in sample 6. The procedure similar to that described above is employed to make the varistor that includes the sintered mass of sample 6.

Example 3

The transition metal oxide and the additives are weighed to provide a powder mixture as in sample 12. The procedure similar to that described above is employed to make the varistor that includes the sintered mass of sample 12.

Figure 4:
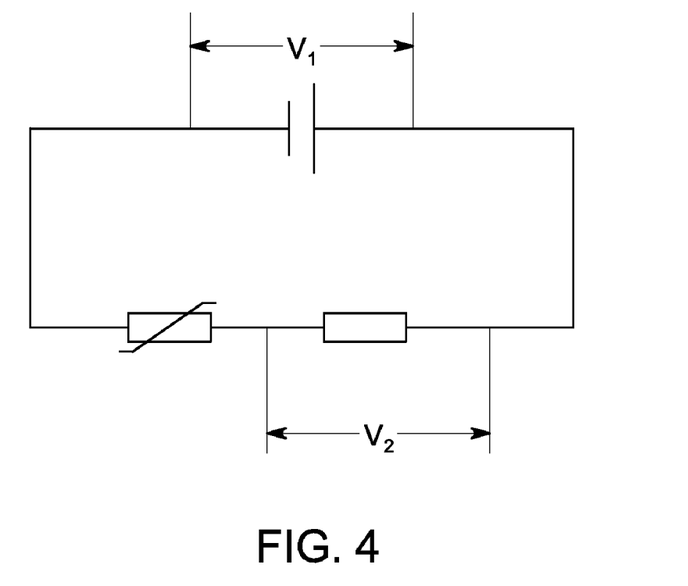
FIG. 4 shows a schematic drawing of an electrical circuit in accordance with one embodiment of the invention

Current-Voltage (I-V) Measurement:

A 10 kiloOhm or 100 MegaOhm resistor 64 is connected in parallel to the varistor 62 and a voltage is applied. V1, the total voltage on sample 66 and varistor is measured using a high voltage probe. V2, the voltage on the resistor is measured by a multimeter. V2 is used to calculate the current flowing through the varistor as given in FIG. 4. V1-V2 is the voltage on the Samples 1-6. To measure I-V curve, at low voltage, a 100 MOhm resistor is used until the voltage on it is higher than about 100 Volts. A 10 kilo Ohm resistor is used to measure the I-V curve under high voltage (higher than about 100 Volts).

Figure 5:
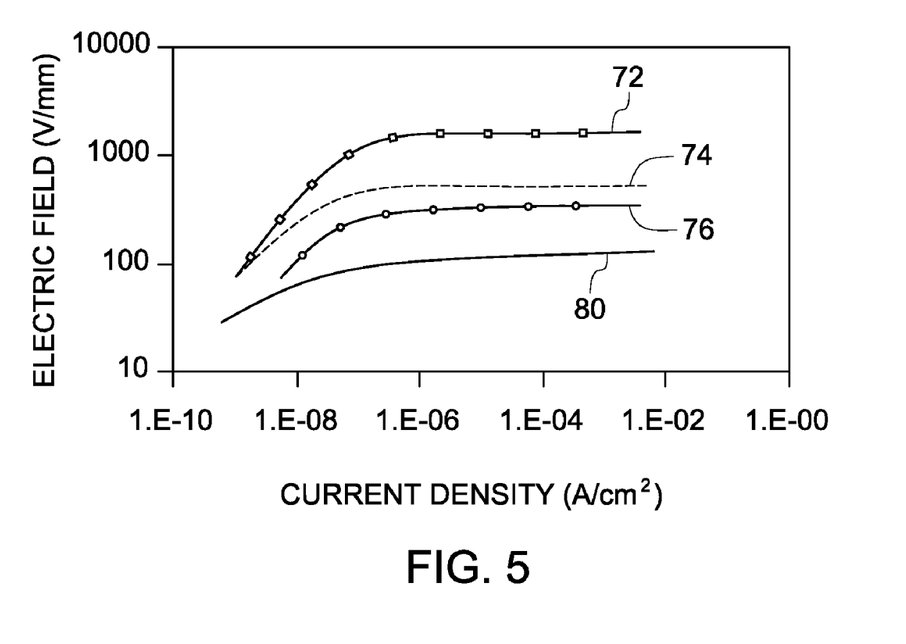
FIG. 5 shows a graph of the electric field versus the current density (current voltage graph) for an article in accordance with one embodiment of the invention and a comparative sample

FIG. 5 shows the results of metal oxide varistor materials of Samples 1-3 relative to a commercially available metal oxide varistor material. The materials of Samples 1-3 display relatively better breakdown strength and relatively better nonlinearity compared to Comparative Sample 1. The breakdown fields (electric fields when current density is 1 milliAmp per square centimeter) and nonlinearity coefficient α calculated are summarized in Table 2.

TABLE 2

Breakdown fields and nonlinearity of metal oxide varistor made from Sintered mass of Samples 1-3 and commercially available metal oxide varistor material

| Composition | Sintering Temperature (° C.)/ Time (Hours) | Breakdown Field (V/mm) | Nonlinearity coefficient α |
|---|---|---|---|
| Sample 1 | 1000/2 | 1343 | 63 |
|  | 1050/2 | 972 | 138 |
| Sample 2 | 950/2 | 2800 | 40 |
|  | 1000/2 | 2216 | 18 |
| Sample 3 | 850/2 | 1710 | 77 |
|  | 900/2 | 546 | 19 |
|  | 950/2 | 515 | 77 |
|  | 1000/2 | 400 | 42 |
|  | 1050/2 | 315 | 79 |
| Comparative Sample 1 | NA | 125 | 22 |

Table 2 shows that the metal oxide varistor materials of Samples 1-3 perform better after low temperature firing. For example, Sample 3 gives a breakdown field of greater than about 1700 volts per millimeter and a good nonlinearity coefficient (α) of about 77, but still has a low sintering temperature of 850 degrees Celsius.

Figure 6:
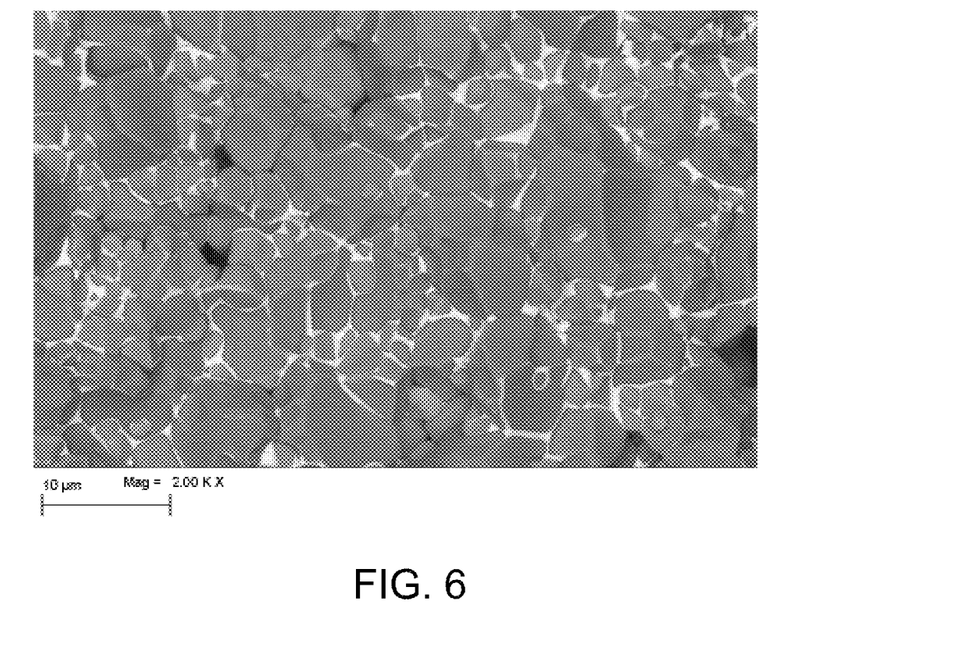
FIG. 6 shows SEM micrographs of a composition in accordance with an embodiment and a control blank.
Figure 7:
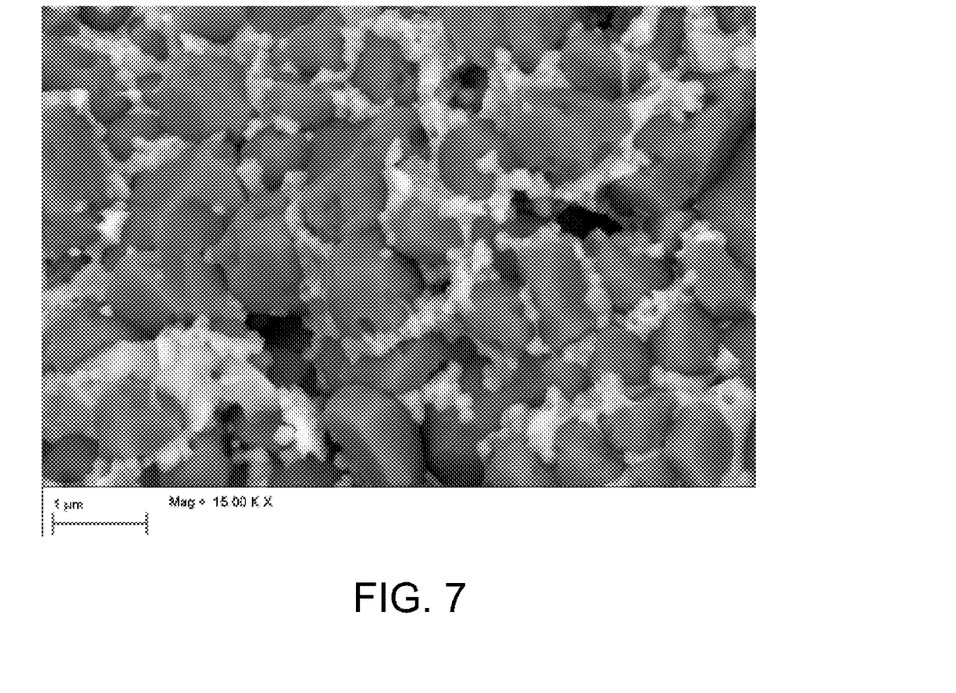
FIG. 7 shows SEM micrographs of a composition in accordance with one embodiment of the invention.

Microstructure formation may depend at least in part on the sintering profile. Grain size is found to increase at higher sintering temperature. FIGS. 6-7 compare the microstructure of a commercially available metal oxide varistor material Comparative Sample 1 (FIG. 6) with a metal oxide varistor material of Example 3 (FIG. 7). The average grain size of the metal oxide varistor materials of Sample 3 (sintered at 850 degrees Celsius) is less than 1 micrometer; and, this is in comparison to the commercially available metal oxide varistor material Comparative Sample 1 that has a grain size that is greater than 10 micrometers. Several phases may coexist in the metal oxide varistor materials of Samples 1-3. These phases may include the major conductive phase of less than 1 micrometer in size and one or more secondary phases located at the grain boundaries and in the grain boundary layer, which itself may include various dopants and sintering additives.

Table 3 shows that the metal oxide varistor materials may perform relatively well, displaying a breakdown field of greater than about 1700 volts per millimeter and a good nonlinearity coefficient (α) of greater than about 75, but still having a relatively low sintering temperature.

TABLE 3

| Composition (Wt percent) | Sample 4 | Sample 5 | Sample 6 | Samples 7-11 | Sample 12 | Sample 13 | Sample 14 |
|---|---|---|---|---|---|---|---|
| ZnO | 85.5 | 94 | 94.69 | 94.69 | 95.0 | 84.0 | 94.0 |
| $Bi_2O_3$ | 2 | 0.5 | 3 | 3 | 3.5 | 3 | 3 |
| $Sb_2O_3$ | 3 | 1.4 | 1.5 | 1.5 | 0.2 | 3 | 0.1 |
| $Al_2O_3$ | 3 | — | 0.01 | 0.01 | 0.1 | — | — |
| $SiO_2$ | 3 | 2 | — | — | 0.1 | 0.5 | 1.0 |
| $Cr_2O_3$ | 0.95 | 0.04 | — | — | 0.1 | — | — |
| MnO | — | — | — | — | 0.1 | 0.5 | — |
| $Mn_2O_3$ | — | 0.6 | — | — | 0.1 | — | — |
| MgO | 0.05 | — | — | — | 0.1 | 1 | — |
| $Fe_2O_3$ | — | — | — | — | 0.1 | 0.5 | — |
| $Co_2O_3$ | — | — | — | — | 0.1 | 2.5 | — |
| $Co_3O_4$ | 2.5 | 0.5 | 0.5 | 0.5 | 0.1 | — | — |
| NiO | — | 0.96 | 0.2 | 0.2 | 0.1 | 3 | — |
| $SnO_2$ | — | — | — | — | 0.1 | — | — |
| $Li_2CO_3$ | — | — | 0.1 | 0.1 | 0.1 | 1.5 | 0.9 |
| $LiBiO_3$ | — | — | — | — | 0.1 | — | 1 |
| CaO | — | — | — | — | 0.1 | 0.5 | — |
| Breakdown Field (V/mm) | >1800 | >1800 | >1850 | — | — | — | — |
| Nonlinearity coefficient (α) | >75 | >80 | >75 | — | — | — | — |

Figure 8:
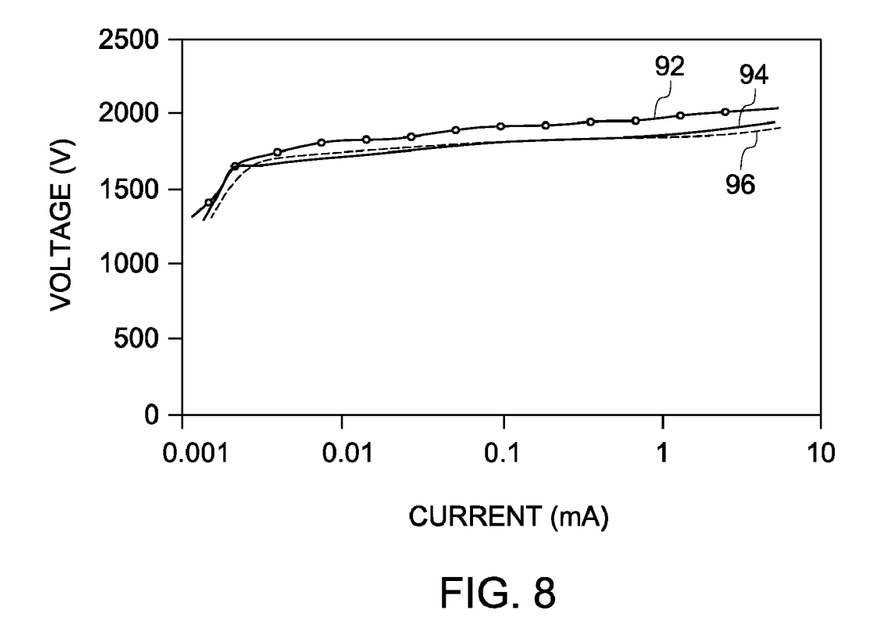
FIG. 8 shows a graph of the I-V characteristics under a DC mode (current voltage graph) for an article in accordance with one embodiment of the invention.
Figure 9:
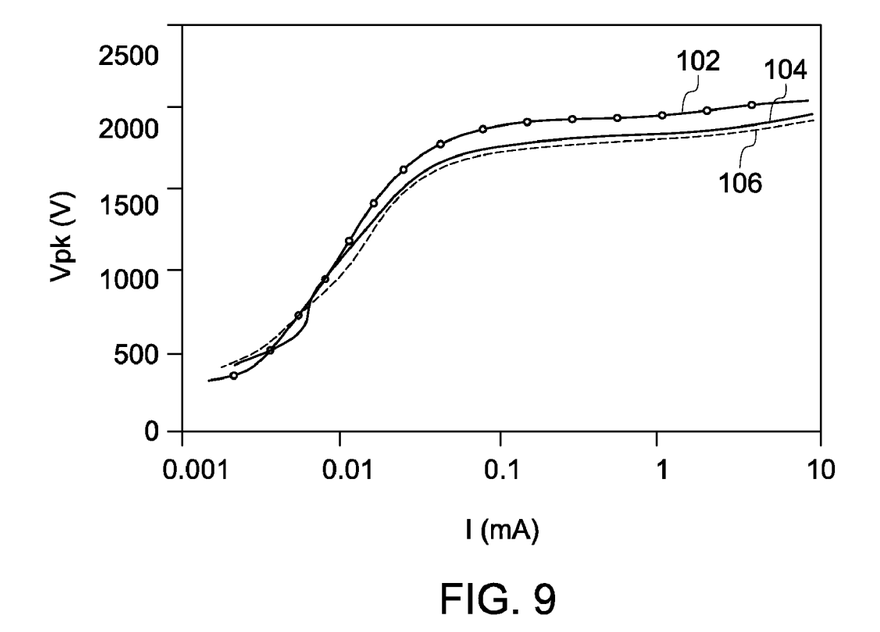
FIG. 9 shows a graph of the I-V characteristics under an AC mode (current voltage graph) for an article in accordance with one embodiment of the invention.

FIGS. 8 and 9 show a comparison of I-V characteristics under DC and AC modes respectively of the varistor samples. As could be observed the sample to sample variation is limited and the leakage current under AC test mode is higher than DC test mode while the nonlinearity does not change much.

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these, other subsequent changes, transformations, or reactions the reactants, ingredients, or the components to be brought together may identify or indicate the reaction product or final material.

The embodiments described herein are examples of articles, compositions, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, compositions and methods that do not differ from the literal language of the claims, and further includes other articles, compositions and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An article, comprising:
a plurality of layers, each layer comprising:
a unsintered mass having a sinter temperature that is less than about 1050 degrees Celsius,
an inner electrode proximate to the unsintered mass, wherein the inner electrode is comprised of a material having a melting point that is within a determined temperature range of about 10 degrees Celsius to about 200 degrees Celsius above the sintering temperature.

2. The article as defined in claim 1, wherein the inner electrode and the unsintered mass have been subjected simultaneously to the sinter temperature to form a metal oxide varistor.

3. The article as defined in claim 1, wherein at least one inner electrode consists essentially of silver.

4. The article as defined in claim 1, wherein the inner electrode comprises one or more of aluminum alloy, silver-palladium alloy, copper, silver, tin, aluminum, iron, carbon, nickel, chromium, or gold, and which is present in an amount or a ratio such the melting temperature of the inner electrode is controlled relative to the sintering temperature of the unsintered mass so that co-firing of the inner electrode and the unsintered mass at about the sintering temperature produces a varistor.

5. The article as defined in claim 1, wherein the inner electrode is free of platinum, palladium, or both platinum and palladium.

6. The article as defined in claim 1, wherein the inner electrode comprises a metal having a melting point of less than about 950 degrees Celsius.

7. The article as defined in claim 1, wherein the unsintered mass comprises zinc oxide.

8. The article as defined in claim 1, wherein the unsintered mass further comprises a sintering additive and a grain growth inhibitor additive.

9. The article as defined in claim 8, wherein the sintering additive comprises one or both of $Li_2CO_3$ and $LiBiO_3$.

10. The article as defined in claim 8, wherein the grain growth inhibitor additive comprises one or more of $SiO_2$, $Sb_2O_3$, $CaO$, $Al_2O_3$, $MgO$, or $Fe_2O_3$.

11. The article as defined in claim 1, wherein the article is sintered to form a nano-structured varistor comprising a sintered mass and an electrode, wherein the sintered mass comprises a plurality of nano-sized cores and a grain boundary layer disposed between each of the plurality of cores.

12. The article as defined in claim 11, wherein the sintered mass has a plurality of cores, and an average diameter of the cores is less than about 500 nanometers.

13. The article as defined in claim 11, wherein an average distance from one core to an adjacent core in the plurality of cores is less than about 500 nanometers.

14. The article as defined in claim 11, wherein an average thickness of the nano-structured sintered mass is less than about 1000 micrometers.

15. The article as defined in claim 1, further comprising an outer electrode.

16. The article as defined in claim 15, wherein the outer electrode comprises one or more of lead, tin, aluminum, copper, gold, silver, lead-tin alloy, tin-copper alloy, palladium, or alloys of the forgoing.

17. The article as defined in claim 1, wherein the article has a dielectric constant of less than about 1000.

18. The article as defined in claim 1, wherein the article has a sintered density of more than about 95%.

19. The article as defined in claim 1, wherein the article has a leakage current of less than about $10^{-5}$ Ampere per square centimeter.

20. The article as defined in claim 1, wherein the article has a breakdown voltage of greater than about 0.5 kilo Volt per millimeter.

21. The article as defined in claim 1,*wherein the article responds to electrical voltage overstress of about 1 kilo Volts by shunting electrical current to a ground.

22. The article as defined in claim 1, wherein the article protects against an overstress above a threshold voltage of about more than about 10 volts.

23. The article as defined in claim 1, wherein the unsintered mass is sandwiched between the inner electrodes.

24. The article as defined in claim 1, wherein the thickness of the unsintered mass is less than about 100 microns.

25. The article as defined in claim 1, wherein the thickness of the article is less than about 5 millimeters.

26. The article as defined in claim 1, wherein the thickness of the inner electrodes is less than about 100 microns.

27. An electronic device comprising the article of claim 1.

28. A method of protecting an electric circuit comprising the electronic device of claim 27 from a transient electrical voltage surge or spike, comprising:
  electrically connecting the article to a power source for the electrical circuit, and the electrodes to ground.

29. A method, comprising:
  sintering a unsintered mass at a temperature in a temperature profile that is sufficiently high that a sintered mass is formed from the unsintered mass, and the temperature profile is less than about 1050 degrees Celsius; and
  forming one or more inner electrodes coupled to the sintered mass simultaneously with the sintering, and thereby to form an article having plurality of layers each layer comprising the inner electrodes coupled to, and in electrical communication through, the sintered mass.

30. The method as defined in claim 29, further comprising selecting the inner electrode to be a metal having a melting point within a determined temperature range relative to the temperature profile.

31. The method as defined in claim 29, wherein sintering comprises directing microwave radiation at the unsintered mass.

32. An article, comprising:
  a plurality of layers, each layer comprising:
  a unsintered mass having a sinter temperature that is less than about 1050 degrees Celsius,
  wherein the inner electrode is comprised of a material having a material having a melting point that is within a determined temperature range of about 10 degrees Celsius to about 200 degrees Celsius relative to the sintering temperature.

* * * * *